United States Patent
Nagao

(10) Patent No.: US 7,047,486 B1
(45) Date of Patent: May 16, 2006

(54) METHOD AND DEVICE FOR PROCESSING DOCUMENTS AND RECORDING MEDIUM

(75) Inventor: Katashi Nagao, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/623,632

(22) PCT Filed: Jan. 18, 2000

(86) PCT No.: PCT/JP00/00203

§ 371 (c)(1),
(2), (4) Date: Oct. 17, 2000

(87) PCT Pub. No.: WO00/43909

PCT Pub. Date: Jul. 27, 2000

(30) Foreign Application Priority Data

Jan. 21, 1999 (JP) .......................................... 11-013307

(51) Int. Cl.
*G06F 17/00* (2006.01)

(52) U.S. Cl. .......................................... 715/514; 707/6
(58) Field of Classification Search ................ 715/514, 715/500; 707/3, 5, 6, 102, 104.1
See application file for complete search history.

(56) References Cited

U.S. PATENT DOCUMENTS

| | | | | |
|---|---|---|---|---|
| 5,943,669 | A | * | 8/1999 | Numata ........................... 707/5 |
| 5,987,460 | A | * | 11/1999 | Niwa et al. ..................... 707/6 |
| 6,212,532 | B1 | * | 4/2001 | Johnson et al. ............. 715/500 |
| 6,243,723 | B1 | * | 6/2001 | Ikeda et al. .................. 715/514 |
| 6,446,061 | B1 | * | 9/2002 | Doerre et al. ................... 707/3 |
| 6,671,683 | B1 | * | 12/2003 | Kanno ............................ 707/5 |
| 6,711,585 | B1 | * | 3/2004 | Copperman et al. ..... 707/104.1 |
| 6,718,333 | B1 | * | 4/2004 | Matsuda ...................... 707/102 |

FOREIGN PATENT DOCUMENTS

JP          10-254883         9/1998

OTHER PUBLICATIONS

Koichi Hashida, "GDA Versatile and Intelligent Content ware with Semantic Annotation", Journal of Japanese Society for Artificial Intelligence, vol. 13., No. 4, Jul. 1, 1998, pp. 528–535.
Katashi Nagao, Koiti Hasida, "Automatic Text summarization Based on the Global document Annotation", 36th Annual Meeting of the Association for Computational Linguisitcs and 17th International Conference on Computational Linguistics Proceedings of the Conference vol. II, (Aug. 10, 1998), pp. 917–921.

* cited by examiner

*Primary Examiner*—Sanjiv Shah
(74) *Attorney, Agent, or Firm*—Bell, Boyd & Lloyd LLC

(57) ABSTRACT

A method and an apparatus for processing a document of a tagged internal structure made up of a plurality of elements. A plurality of documents received by a receiving unit are stored in a RAM of a storage unit provided in a main body portion of the apparatus. The characteristic information representing the characteristics of a document is extracted in accordance with the sequence of operations recorded on a ROM under control by controller. Each document is classified into classification items making up a classification model, depending on the degree of interrelation between the characteristic information of the document extracted by a characteristic information extraction unit and the classification-item-based information to realize automatic document classification in such a manner as to reflect the interest of a user.

15 Claims, 9 Drawing Sheets

| CLASSES | SPORTS | SOCIAL | COMPUTER | PLANTS | ART | EVENTS |
|---|---|---|---|---|---|---|
| PROPER NOUN | MR.A | B-COMPANY | C-COMPANY G-COMPANY | SPECIES D | MR.E | MR.F |
| WORD MEANING | GROUND FOR BASEBALL | LABOR EMPLOYMENT | MOBILE | CHERRY 1 (11111) ORANGE 1 | CHERRY 2 (11112) ORANGE 2 | CHERRY 3 (11113) |
| | | | | | | |
| DOCUMENT ADDRESS | 12345 | 22222 | 33333 | 44444 | 55555 | 66666 |

METHOD AND DEVICE FOR PROCESSING DOCUMENTS AND RECORDING MEDIUM

TECHNICAL FIELD

This invention relates to a document processing method and apparatus for processing a document having an internal structure in connection with elements and to a recording medium having recorded thereon a program adapted for processing the document. More particularly, it relates to a document processing method and apparatus in which each document is classified based on the degree of interrelation of semantics contained in the document and a recording medium having recorded thereon a document processing program for classifying the document based on the degree of interrelation of semantics contained in the document.

BACKGROUND ART

Up to now, WWW (World Wide Web) is used as an application service furnishing the hyper text type information in a window style. This WWW is the system for executing document processing such as creation, publication or co-owning of documents for suggesting the possibility of a new style document. From the standpoint of practical utilization of documents, a demand is raised for advanced document processing which surpasses WWW, such as document classification or summarizing based on the document contents. For such advanced document processing, mechanical processing of document contents is indispensable.

The mechanical processing of document contents still continues to be difficult for the following reason: First, the HTML (Hyper Text Markup Language), as a language stating the hyper text, prescribing the expression of sentences, hardly prescribe the document contents. Second, the hyper text network, constructed between sentences, are not convenient for the reader of the document to exploit for understanding the document contents. Third, a writer of sentences usually writes without taking account of the convenience for the user, whilst the convenience for the user is not adjusted for the convenience of the writer.

Whilst the WWW is a system suggesting the possibility of a new style document, it is not able to realize advanced document processing since it does not process the document mechanically. If, in WWW, advanced document processing is to be executed, the document needs to be processed mechanically.

For enabling mechanical document processing, a system for supporting mechanical document processing has been developed based on achievement in the field of researches in natural languages. As a first step for document processing by researches in the natural languages, there has been proposed mechanical document processing exploiting tags presupposed to be imparted to the document as the attribute information on the internal structure of a document created by the writer of the document.

In keeping pace with the progress in computers and in network, a demand is raised for improving functions in document processing in creation, labelling or changing a text document such as by sentence processing or indexing dependent on the sentence contents. For realizing this document processing with improved functions, it is necessary to process documents based on the degree of interrelation of respective semantics in the document.

DISCLOSURE OF THE INVENTION

It is therefore an object of the present invention to provide a method and apparatus for document processing which is based on the degree of interrelation of semantics in document contents and a recording medium having recorded thereon a program for sentence processing which is based on the degree of interrelation in a document.

In one aspect, the present invention provides a method for processing a document including an internal structure made up of a plurality of elements, including a characteristic information extracting step of extracting characteristics of the document, and a document classification step of classifying each document into a plurality of classification items making up a classification model depending on the degree of interrelation between the characteristic information of the document extracted by the characteristic information extracting step and the classification-item-based characteristic information.

In another aspect, the present invention provides a method for processing a document of an internal structure made up of plural semantics, the method including a weighting step for weighting each semantics based on the structure of reciprocal referencing among the semantics, and a degree of interrelation calculating step of dividing a difference of a weight, imparted to one semantics, as a dependent variable, by a difference of a weight, imparted to the other semantics, as an independent variable, with the resulting quotient being the degree of interrelation between the one and the other semantics.

In still another aspect, the present invention provides an apparatus for processing a document including an internal structure made up of a plurality of elements, including characteristic information extracting means for extracting characteristics of the document, and document classification means for classifying each document into a plurality of classification items making up a classification model depending on the degree of interrelation between the characteristic information of the document extracted by the characteristic information extracting step and the classification-item-based characteristic information.

In still another aspect, the present invention provides an apparatus for processing a document of an internal structure made up of plural semantics, the method including weighting means for weighting each semantics based on the structure of reciprocal referencing among the semantics, and degree of interrelation calculating means for dividing a difference of a weight, imparted to one semantics, as a dependent variable, by a difference of a weight, imparted to the other semantics, as an independent variable, with the resulting quotient being the degree of interrelation between the one and the other semantics.

In still another aspect, the present invention provides a recording medium having recorded thereon a document processing program for processing a document of an internal structure made up of a plurality of elements, in which the document processing program includes a characteristic information extracting step of extracting characteristics of the document, and a document classification step of classifying each document into a plurality of classification items making up a classification model depending on the degree of interrelation between the characteristic information of the document extracted by the characteristic information extracting step and the classification-item-based characteristic information.

In yet another aspect, the present invention provides a recording medium having recorded thereon a document processing program for processing a document o an internal structure made up of a plurality of elements, in which the document processing program includes a weighting step for weighting each semantics based on the structure of reciprocal referencing among the semantics, and a degree of interrelation calculating step of dividing a difference of a weight, imparted to one semantics, as a dependent variable, by a difference of a weight, imparted to the other semantics, as an independent variable, with the resulting quotient being the degree of interrelation between the one and the other semantics.

BEST MODE FOR CARRYING OUT THE INVENTION

Figure 1:
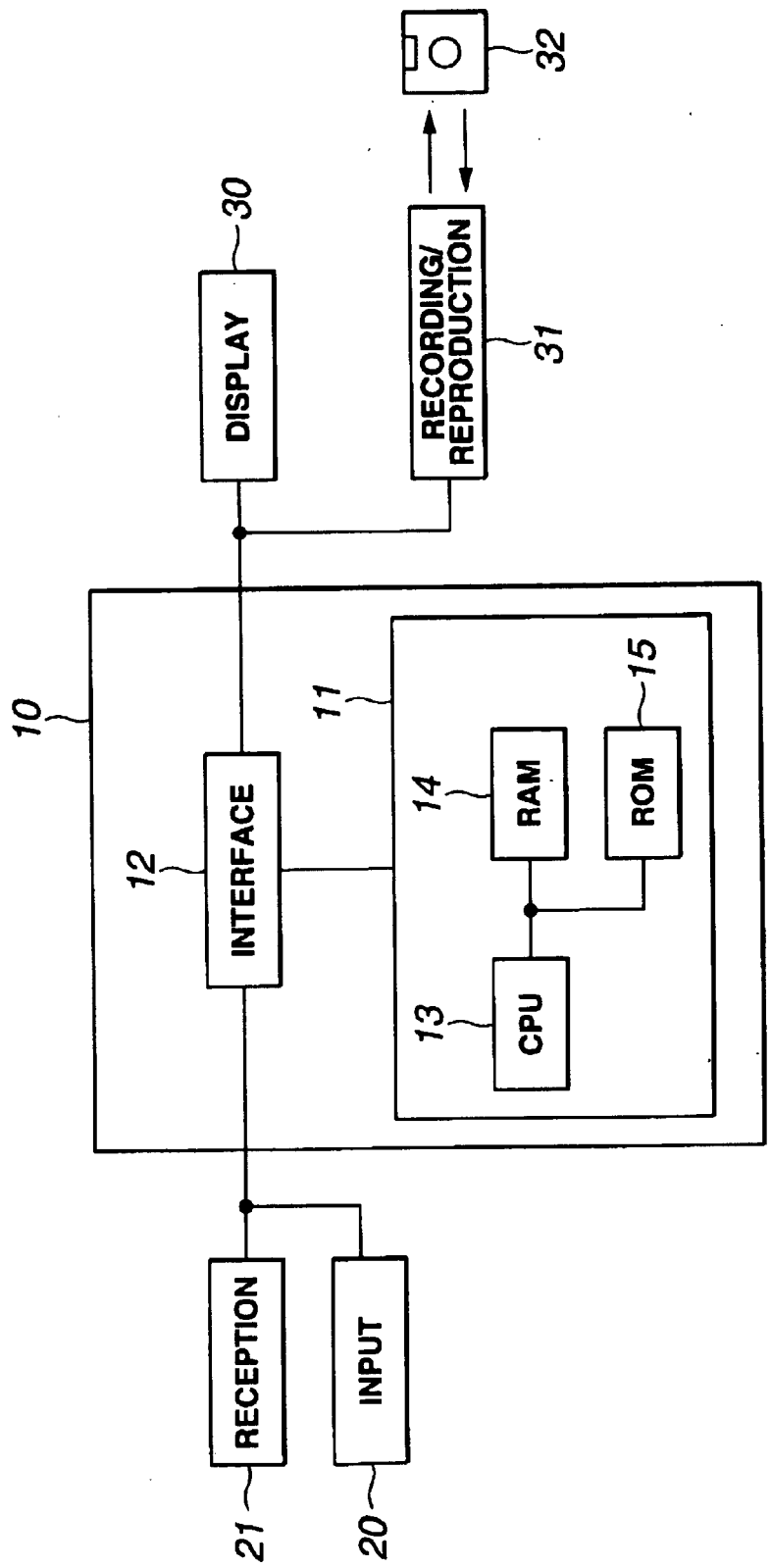
FIG. 1 is a block diagram showing a document processing apparatus embodying the present invention.

Referring to the drawings, the document processing method and apparatus and a recording medium according to the present invention will be explained in detail.

Referring first to FIG. 1, the document processing apparatus according to the present invention includes a main body portion 10, having a controller 11 and an interface 12, an input unit 20 for receiving an input from a user to send the input to the main body portion 10, a receiving unit 21 for receiving signals from outside to send the received signal to the main body portion 10, a display unit 30 for demonstrating an output of the main body portion 10 and a recording and/or reproducing unit 31 for recording the information on a recording medium 32 and for reproducing the information recorded on the recording medium 32.

The main body portion 10, having the controller 11 and the interface 12, constitutes an essential portion of the present document processing apparatus. The controller 11 includes a CPU 13 for centralized execution of the processing in the present document processing apparatus, a RAM 14, as a volatile memory, and a ROM 15, as a non-volatile memory. The CPU 13 manages control for storing the data transiently in the RAM 14 to execute the program, as appropriate, in accordance with the procedure recorded in the ROM 15. To the interface 12 are connected the input unit 20, the receiving unit 21 and the display unit 30. The interface 12 operates under control by the controller 11 to adjust the timing of data transmission to convert the data format in connection with data input from the input unit 20 and the receiving unit 21 and to data transmission to the display unit 30.

The input unit 20 is a portion which accepts the inputting by a user to this document processing apparatus. The user uses this input unit 20 to input a keyword by a keyboard to select and input elements of a document demonstrated on the display 30 by a mouse. The elements mean elements making up a document and include e.g., documents, sentences and words.

The reception unit 21 is a portion which receives signals transmitted to this document processing apparatus from outside over e.g., a communication network. This receiving unit 21 receives e.g., plural documents which may, for example, be electronic documents. The receiving unit 21 sends received data to the main body portion 10.

The output unit 30 demonstrates the output results from the document processing apparatus. This output unit 30 is made up of a cathode ray tube (CRT) or a liquid crystal display (LCD) and demonstrates one or more windows on which to demonstrate letters, figures etc.

The recording and/or reproducing unit 31 is controlled by the controller 11 of this document processing apparatus and records and/or reproduces the information on or from a recording medium 32, such as a floppy disc. On this recording medium 32 is recorded a program which finds the degree of interrelation based on the meanings of the document to execute document processing based on this degree of interrelation. This recording medium will be explained in detail subsequently.

Figure 2:
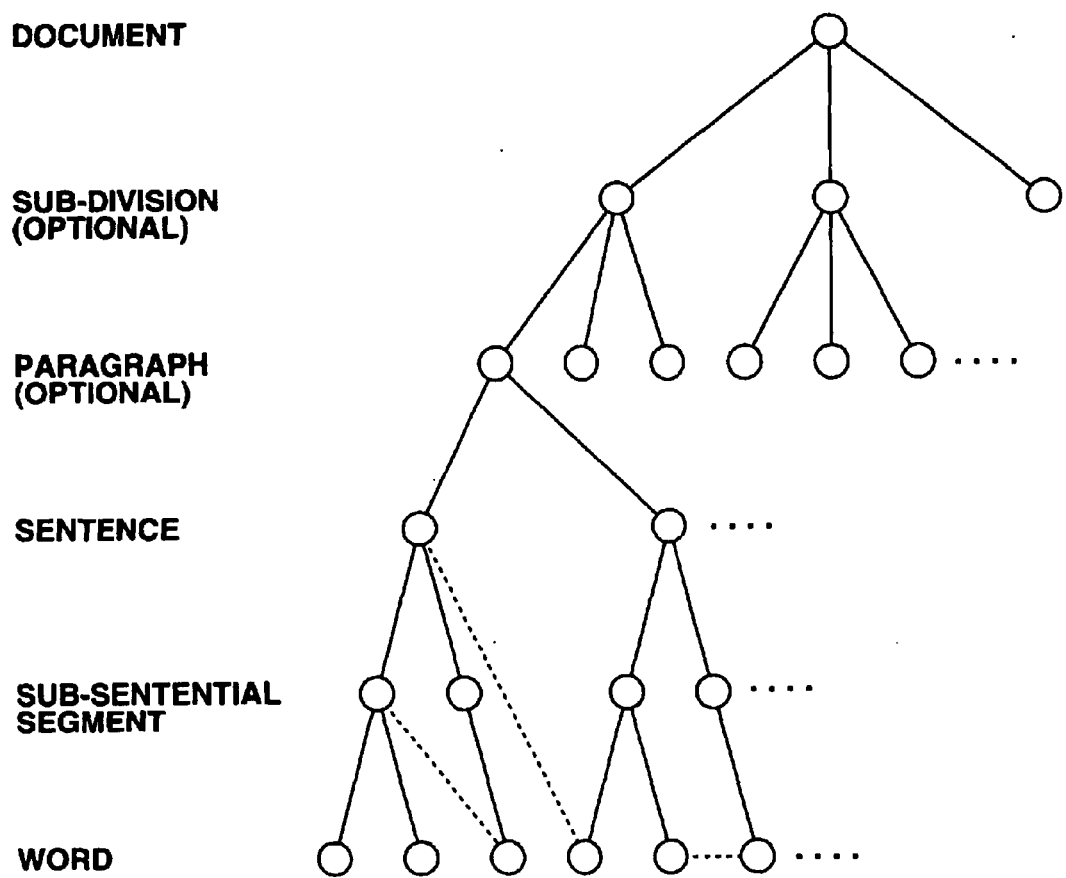
FIG. 2 is a tree diagram showing an inner structure by document tagging.

The document handled in the present invention is explained. This document has an internal structure by tree-like tagging. According to the present invention, the internal structure by tagging, elements such as documents, sentences or vocabulary elements, ordinary links, referencing links and referenced links are previously affixed as tags to the document. In FIG. 2, white circles ○ indicate document elements, or elements, with the white circles of the lowermost order being vocabulary elements corresponding to the words representing the lowermost level words in the document. The solid lines indicate normal links representing the structures of the document, such as words, phrases or sentences. The dotted lines indicate reference links representing the interrelation by reciprocal referencing. The internal document structure by tagging is a hierarchical structure from an upper order to a lower order, specifically, from a document, optional subdivisions which is on the lower order side of the document and on the upper order side of paragraphs, sentences, sub-sentential segments lying on the lower order side of the sentences up to the lowermost order side vocabulary elements.

As the internal document structure by tagging, semantic or grammatical tags common to multiple languages are accorded to the document to enable the mechanical understanding of the contents of the document. The tags represent the attribute information accorded to the data in order to represent attributes of the data.

The internal document structure by tagging is of the XML (Extended Markup Language) form as in the case of the HTML (Hyper Text Markup Language). That is, the tags contain the information such as syntactic or semantic information, e.g., the reciprocal interrelation, inclusive of the subject denoted by a pronoun or the meaning of a polysemous word.

An example of the internal structure of a document by tagging is shown below. It is noted that the following is merely illustrative of a variety of tagging methods.

For example, a sentence reading: "Time flies like an arrow" can be tagged by <sentence><noun phrase meaning= "time0">time</noun phrase><verb phrase><verb meaning= "fly1">flies</verb><adjective verb phrase><adjective verb semantics=like0>like</adjective verb><noun phrase> an <noun meaning="arrow0">arrow</noun></noun></noun phrase></adjective verb phrase></verb phrase>.</ sentence>. It is noted that the <sentence>, <noun>, <noun phrase>, <verb>, <verb phrase>, adjective verb> and <adjective verb phrase> denote a syntactic structure of a sentence, such as a sentence, a noun, a noun phrase, a verb, a verb phrase, an adjective/adjective phrase, including a prepositional phrase or postpositional phrase, and adjective phrase/adjective verb phrase. The tags are placed ahead of the foremost end and at back of the trailing end of an element. Here, the tag placed at back of the rear end of an element indicates by a symbol "/" the trailing end of the minimal unit of the document, that is the trailing end of an element. This element indicates the semantic constituent, that is phrases, clauses and sentences. Meanwhile, the meaning=time0 indicates the 0th meaning among plural meanings, that is semantics, proper to the word time. Specifically, the time, having a meaning of a noun and a meaning of a verb, here indicates a noun. For example, the meanings as a color and a fruit, proper to the word "orange", can be distinguished from each other according to the meanings.

Figure 3:
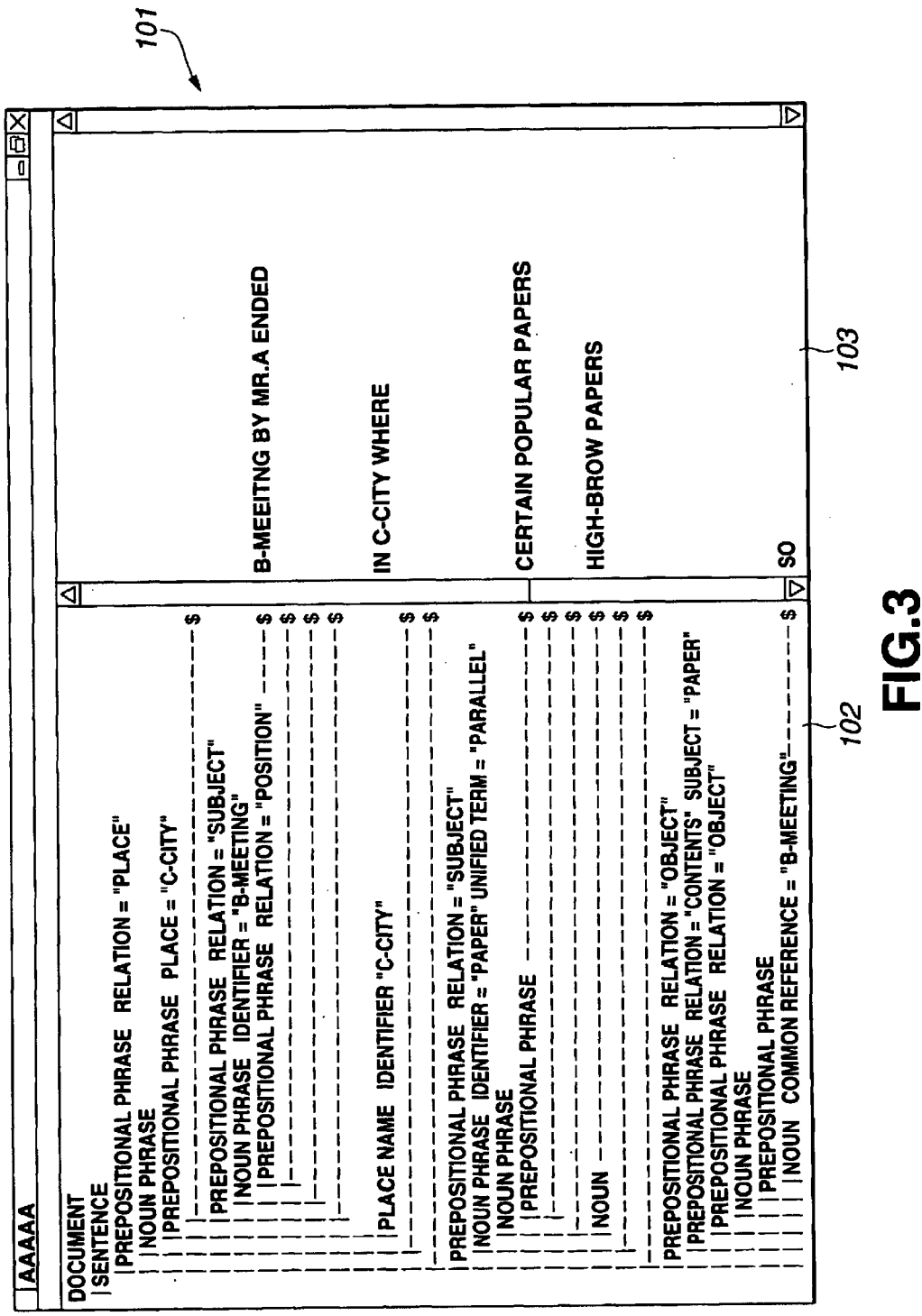
FIG. 3 is a plan view showing a window demonstrating an inner structure by document tagging.

The syntactic structure of the internal structure of the document by tagging, as explained with reference to FIG. 2, can be demonstrated as in a window 101 shown in FIG. 3. In this window 101, a right half portion 103 denotes the vocabulary element and a left half portion 102 denotes the sentence structure. In this window 101 is demonstrated the following document by tagging. In this document, the syntactic structure is represented by tags. The following document represents the internal structure by tagging. In this document, the syntactic structure is again represented by tags. The following document shows the internal structure by tagging on: "In a city C where a meeting B by Mr.A ended, certain popular papers and high-brow papers clarified their intention of voluntarily regulating the news reporting by photos by entering articles on the papers".

```
<document> <sentence>
    <adjective verb phrase relation = "place">
        <noun phrase>
        <adjective phrase place = "city C">
            <adjective phrase relation = "subject">
            <noun phrase identifier = "meeting B"
            <adjective verb phrase relation "position"> of Mr.A </adjective phrase>
            meeting B
        </noun phrase>
        </adjective verb phrase>
        ended
        </adjective verb phrase>
        <place name identifier = "city C"> city C </place name>
    </noun phrase>
    </adjective verb phrase>
    <adjective verb phrase relation = "subject">
    <noun phrase identifier = newspapers" syntactic word = "parallel">
        <noun phrase>
            <adjective verb phrase> certain </adjective phrase>
        popular papers
    </noun phrase> and
    <noun> high-brow papers </noun>
    </noun phrase>
    </adjective verb phrase> "object">
    <adjective verb phrase relation = "contents" subject = "newspaper">
        <adjective verb phrase relation = "object">
            <noun phrase>
            <adjective verb phrase>
                <noun co-reference = "B">
                their
                </noun>
                <adjective verb phrase>
                the news reporting by photos
                </noun phrase>
            </adjective verb phrase>
            voluntarily regulating
            </adjective verb phrase>
            their intention
            </adjective verb phrase>
            </adjective verb phrase relation = "place" > by articles entered on the papers
        </adjective verb phrase>
            clarified
        </sentence><document>
```

In this sentence, the syntactic words="parallel" indicate juxtaposition of (noun) phrases, such as "certain popular papers and high-brow papers". The definition of "parallel" is that the relation of reciprocal pertinence is co-owned. Unless otherwise specified, <noun phrase relation=x><noun>A</ noun>A<noun><noun>B</noun></noun phrase> means that A is dependent on B. On the other hand, relation=x represents the relation attribute of this <noun phrase> element.

The relation attribute stating the interrelation among the syntactic words, meaning and rhetoric in tagging is explained.

The grammatical functions, such as subject, object or indirect object, the role being played, such as the subject of an operation, a subject on which the operation acts, and a subject which enjoys profit, or the rhetorical relation, such as reason or result, are represented by this relation attribute. The relation attribute is represented by the relation=***. In the present embodiment, the relation attribute is stated for the relatively simple grammatical functions, such as the functions of words in a sentence as the subject, object or the indirect object.

Figure 4:
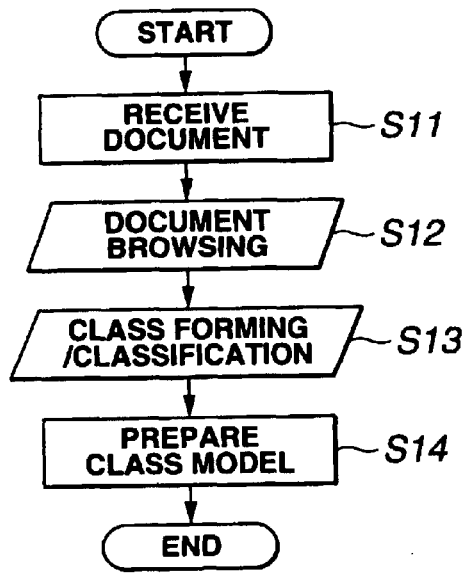
FIG. 4 is a flowchart showing the operation of a document processing apparatus according to the present invention.

Referring to the flowchart of FIG. 4, the operation of a document processing apparatus according to the present invention is explained in detail. The document processing apparatus formulates indices, as guides for the document, containing the characteristic information representing characteristics of the contents of each of plural documents. The document processing apparatus refers to the indices of the respective documents, based on the classification models of documents, to effect automatic classification of the documents. The classification models are made up of plural classification items classifying the documents, with each classification item having the characteristic information representing the characteristics.

At the first step S11, the receiving unit 21 of the document processing apparatus receives plural documents transmitted from outside. The document processing apparatus records the plural documents, received by the receiving unit 21, in e.g., the RAM 14 or in the recording and/or reproducing unit 31, under control by the controller 11. The document has an internal structure by tagging, constituted in a tree fashion from plural elements, as shown in FIG. 2.

At step S12, the user browses the document demonstrated on the display 30 of the document processing apparatus. The controller 11 of the document processing apparatus is responsive to the user's request to control the display unit 30 in such a manner as to demonstrate one of the plural stored documents. The document demonstrated on the display unit 30 of the document processing apparatus is selected by the user inputting the desired one of the plural documents at the input unit 20. In the display unit 30, there are demonstrated the contents of part or all of the document selected by the user in a window the display area of which can be varied in size. The step S12, at which the user browses the documents, is provided if so desired by the user. In FIG. 4, the step S12, as is step S13, is represented by a parallelepiped to indicate that the user operation is presupposed. A specified example of demonstration in the display unit 30 is hereinafter explained. In the present embodiment, it is possible to set or change the categories as classification items by which the user classifies the documents freely. In the present embodiment, the documents are classified automatically by the categories as set by the user.

Figure 5:
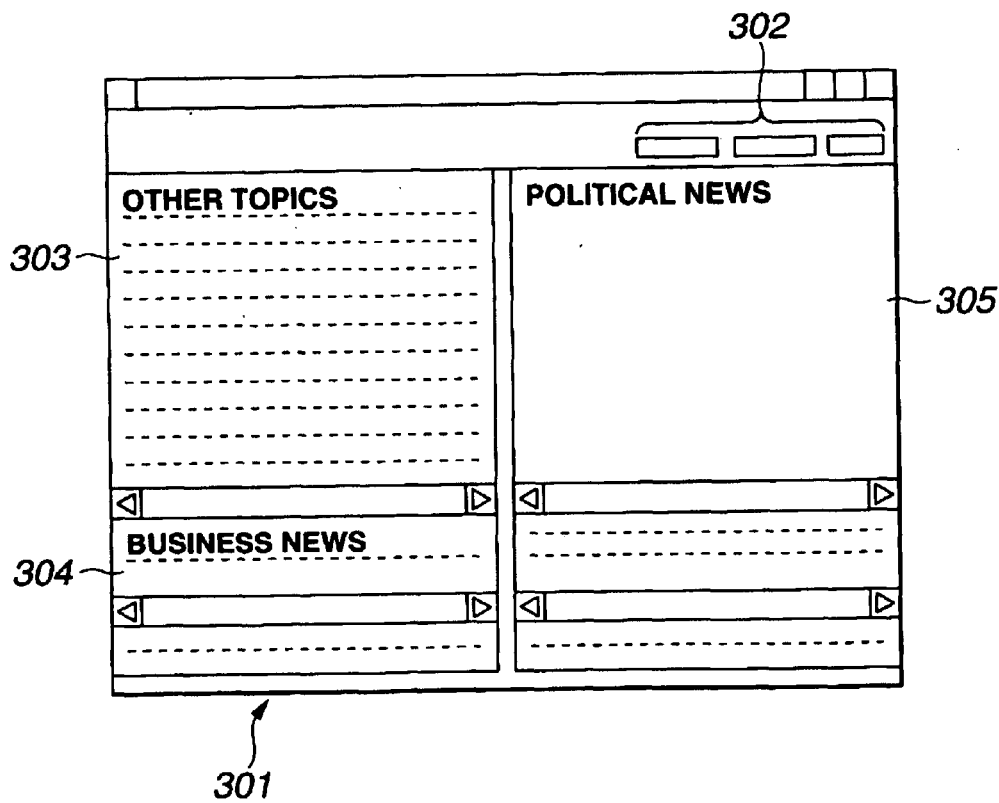
FIG. 5 is a plan view showing a GUI for automatic classification of documents.

A specified example of the graphic user interface (GUI) is as shown in FIG. 5. In this GUI picture, an actuating button 302, and various classification items, such as a first classification display section 303, demonstrating "other topics", a second classification section 303, demonstrating "business news", or a third classification display section, demonstrating "political news", are displayed. Under "other topics", documents not classified under specified classification items, such as "other topics" or "business news", are classified. In the display part of each classification item, the title or the beginning portion of the document is displayed.

In this GUI, the actuating button 302 includes a position resetting for resetting the state of the window on the picture to its initial position (position reset), a browser button for invoking a browser for browsing the contents of a document, and an exit button for exiting the window. The size of each classification display portion is not fixed and can be changed to a desired size. The title of the classification display unit can also be changed freely.

This automatic classification responds to the user interest or aims at improving the efficiency when the user searches for a document.

At step S13, the user formulates classification items, that is categories, for classifying plural documents browsed in the display unit 30 of the present document processing apparatus, and classifies the plural documents in accordance with these classification items. In the document processing apparatus, the setting of document classification items is by adding, changing or deleting desired classification items in the window divided into areas in connection with the number of the classification items. In classifying the plural documents in the document processing apparatus, an icon represented on the screen is clicked and dragged by the mouse operatively linked to a cursor, in the window on which part of the document or the titles of the classification items are demonstrated and in which there are provided areas associated with the titles. This formulation of the document classification and the classification operation are performed by the user having reference to the demonstration on the display unit 30 to make entry in the input unit 20. The classification items prepared and the results of the classification operation are recorded on the RAM 14 under control by the controller 11. Meanwhile, preparation of the classification items of the documents and the operation of document classification will be explained subsequently.

At step S14, the controller 11 of the document processing apparatus prepares a classification model based on the preparation of the classification items at step S13 and on the classification operation consistent with the classification items. The document processing apparatus reads out the classification items at step S13, as recorded on the RAM 14, and the results of the classification operations. The controller 11 of the document processing apparatus collects the proper nouns characteristic of the respective classification items and the meanings of words other than these proper nouns, and the classified document addresses, in connection with the plural documents classified under respective classification items, to generate a classification model. It is noted that the meanings of words rather than the words per se are used for words other than the proper nouns because the same words may have different plural meanings. The controller 11 memorizes the classification model, thus prepared, in e.g., the RAM 14. The manner of preparation of the classification model will be explained in detail subsequently.

By the above-described sequence of steps, the classification model as a reference for document classification has been prepared. The document processing apparatus is able to classify the documents automatically using the classification model as a reference. The operation of automatic classification of newly received documents, executed by the document processing apparatus, will be explained with reference to FIG. 6.

If, in the document processing apparatus, a new document is sent from outside to the receiving unit 21 over e.g., a communication network, the document processing apparatus receives this document. The operation of receiving the document in the document processing apparatus is not explained here because it has already been explained in connection with step S11. The received document is recorded on e.g., the RAM 14 or by the recording and/or reproducing unit 31.

At step S22, the controller 11 of the document processing apparatus reads out the document recorded in the RAM 14 or in the recording and/or reproducing unit 31 and received at step S21. The controller 11 extracts words representing characteristics of each document in the new document to prepare a guide, that is an index, for the document. The controller 11 causes the index for each document to be recorded in e.g., the RAM 14. The preparation of the index will be explained in detail subsequently.

At step S23, the controller 11 of the document processing apparatus classifies each indexed document into one of the plural classification items, prepared at step S13, based on the classification model. The controller 11 records the results of the classification in e.g., the RAM 14. The automatic document classification will be explained in detail subsequently.

At step S24, the controller 11 of the document processing apparatus innovates the classification model based on the results of the automatic classification of the new document, classified at step S23 and recorded on the RAM 14. The controller 11 records the innovated classification model in e.g., the RAM 14.

The above-described document having the tagged internal structure is sent from outside to the receiving unit 21 of t the document processing apparatus. This document is a so-called electronic document, coded digitally. The document processing apparatus records ths document in e.g., the RAM 14 or in the recording and/or reproducing unit 31. The user is able to demonstrate a desired document from plural documents recorded by the document processing apparatus on the display unit 30 for browsing.

The document on the display unit 30 may be displayed on a window the size of which can be changed. The summary of the document may also be displayed with or in place of the document. It is also possible to display the plural documents by respective windows in juxtaposition or to display plural windows in superposition.

The controller 11 of the document processing apparatus executes variable processing operations on the documents, demonstrated on the display unit 30, in accordance with the inputting by the user. The document inputting by the user is by clicking the mouse of the input unit 20, operatively linked to the cursor, demonstrated on the display unit 30, to specify a pre-set area in the display unit 30, or by inputting a keyword from the keyboard of the input unit 20.

Figure 6:
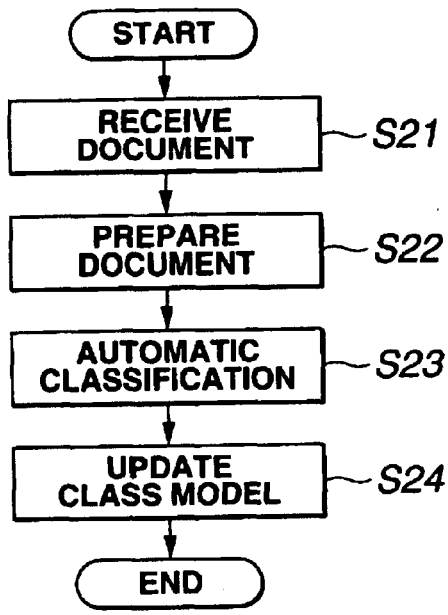
FIG. 6 is a flowchart for automatic classification of documents.

The processing shown in FIGS. 4 and 6, described above, is now explained in first, detail.

Figure 7:
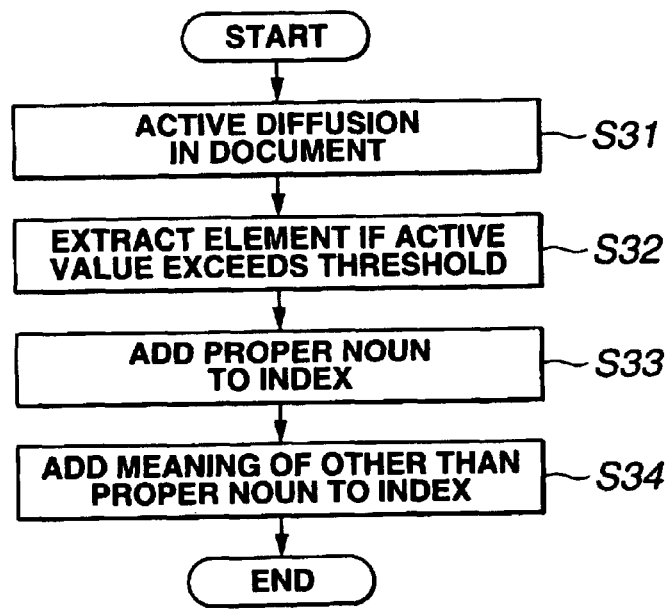
FIG. 7 is a flowchart for finding features of a document for preparing an index.

The sequence of operations of finding the characteristics of the document to create an index, performed at step S22 shown in FIG. 6, is first explained in detail. This index is a word characteristic of a given document, extracted for use as a guide. The sequence of operation of finding the characteristics of the document to create an index is executed, under control by the controller 11 of the document processing apparatus, in accordance with the sequence of operations shown in the flowchart of FIG. 7. In the following sequence of operations, the degree of interrelation of the meanings is calculated and the index is prepared based on the so-calculated degree of interrelation.

First, at step S31, the controller 11 executes active diffusion in the document, received at step S21 in FIG. 6, to diffuse active values of each element in the document. The processing of diffusing active values to the respective elements in the document by the controller 11 will be explained subsequently in detail. The controller 11 records the active values, obtained as a result of the active diffusion, in e.g., the RAM 14.

At step S32, the controller 11 extracts an element, the active value of which exceeds a pre-set threshold value, based on the active value obtained at step S11. The controller 11 records the so-extracted elements in the RAM 14.

The controller 11 at step S33 reads out the element, extracted from the RAM 14 at step S32. The controller 11 takes out the entire proper nouns from this element and adds these proper nouns to the index. Since the proper noun has special properties, such as having no meaning and not being entered in a dictionary, and hence it is handled in a different manner form words other than the proper nouns. Whether or not a given word is a proper noun is identified by e.g., a tag annexed to the document. For example, in the tagged internal structure, shown in FIG. 3, "Mr.A", "meeting B" and "city C" are proper nouns. The controller 11 adds the proper nouns, thus taken out, to the indices and records the results in e.g., the RAM 14.

The controller 11 at step S34 takes out semantics other than the proper nouns from the elements extracted from the RAM 14 at step S32, to add the extracted semantics to the indices to record the results in the RAM 14. The semantics herein denote the selected one of the plural semantics of a word in question. In the present embodiment, the semantics is also given with tagging.

Thus, the sequence of operations of finding the characteristics of a document to prepare an index is finding the characteristics of a document of a tagged internal structure, made up of plural elements, and creating indices representing an array of the characteristics. That is, the document is subjected to active diffusion, based on the tagged internal structure, to diffuse the active values of the respective vocabulary elements, to extract the vocabulary elements having the post-diffusion active values larger than pre-set threshold values. As for these vocabulary elements, proper nouns or the semantics are added to the indices.

The indices, representing the characteristics of a document, may also include an address for the document. The indices, containing words characteristic of the document, may be used as guides in referencing to a pre-set document. The indices, usable for automatic document classification, will be explained in detail subsequently.

A specified example of indices is now explained.

<index date="AAAA/BB/CC" Tune="DD:EE:FF" document address="1234">

<summary> scale of tax reduction, no reference to—meeting by Premier X </summary>

<word semantics="0003" active value="140.6">no reference to</word>

<word semantics="0105" identifier="X" active value="140.6">premier</word>

<name identifier="X" word semantics="6103" active value="140.6">premier X"</word>

<word semantics="5301" active value="140.6">request</word>

<word semantics="2350" identifier="X" active value="140.6">premier</word>

<word semantics="9582" active value="140.6">emphasizing</word>

<word semantics="2595" active value="140.6">reference to</word>

<word semantics="9472" active value="140.6">prediction</word>
<word semantics="4934" active value="140.6">no reference to</word>
<word semantics="0178" active value="140.6">elucidation</word>
<word semantics="7248" identifier="X" active value="140.6">I</word>
<word semantics="3684" identifier="X" active value="140.6">premier</word>
<word semantics="1824" active value="140.6">appealing</word>
<word semantics="7289" active value="140.6">showing</word></index>

In the above indices, <index> and </index> denote the beginning and the end of the index, respectively, <date> and <time> denote the date and time on which the index was prepared, respectively, and <summary> and </summary> denote the beginning and the end of the contents of the index, respectively. On the other hand, <word> and </word> denote the beginning and the end of the word, respectively. The semantics="0003" denotes that the semantics is the third one of plural semantics of the word in question. The same applies for other words.

The method of diffusing active values of the elements by active diffusion, executed at step S31, based on the tagged internal structure, is now explained. This active diffusion is also carried out at step S62 in FIG. 11.

In the document having the tagged internal structure, active values consistent with the tagged internal structure can be accorded to the respective elements by executing the processing termed active diffusion. This active diffusion is the processing of according high active values even to elements pertinent to elements having high active values. These active values, determined depending on the tagged internal structure, can be used for analyzing the document taking the tagged internal structure into account.

Figure 8:
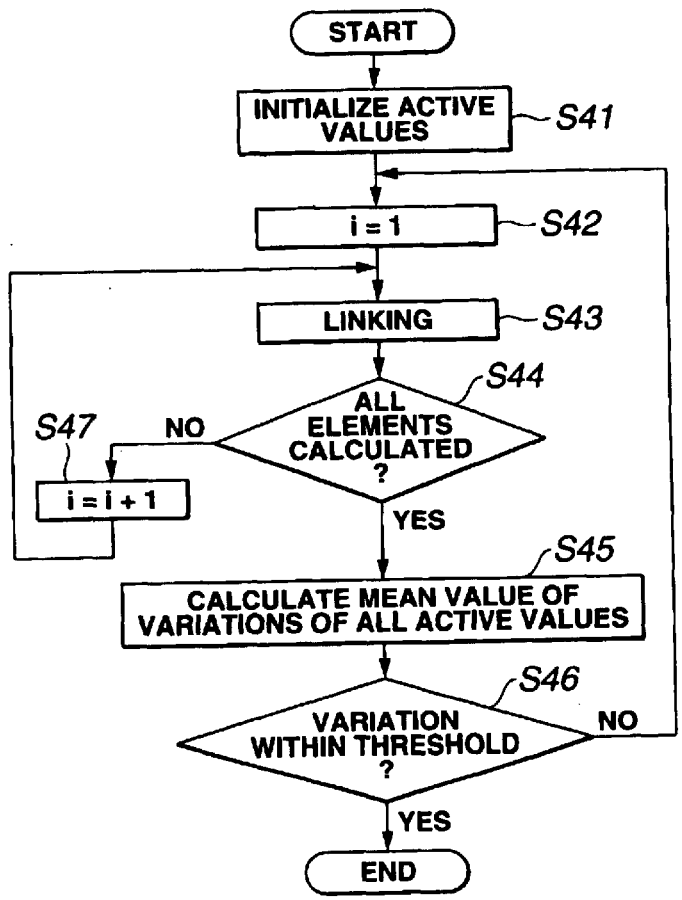
FIG. 8 is a flowchart for illustrating the active diffusion.

The active diffusion is executed, under control by the controller 11 of the document processing apparatus, in accordance with the sequence of operations shown in the flowchart of FIG. 8.

At the first step S41, the active values of the elements in a document are initialized. Specifically, the controller 11 allocates initial values of the active values to the entire elements excluding the vocabulary elements and to the vocabulary elements. For example, 1 and 0 may be allocated, as initial active values, to the entire elements excluding the vocabulary elements and to the vocabulary elements, respectively. The controller 11 may also allocate non-uniform values to the initial values of the active values of the respective elements to permit reflection of excursions of the initial active values obtained as a result of the active diffusion. For example, the initial active value may be set to a higher value for an element the user is interested in to realize an active value which reflects the user's interest.

As for the referencing link and referenced link, interconnecting the elements of the referencing/referenced interrelation, and other ordinary links, a terminal active value, as active value of links interconnecting the elements, is set to 0. The controller 11 records the initial active value, thus accorded, in the RAM 14.

Figure 9:
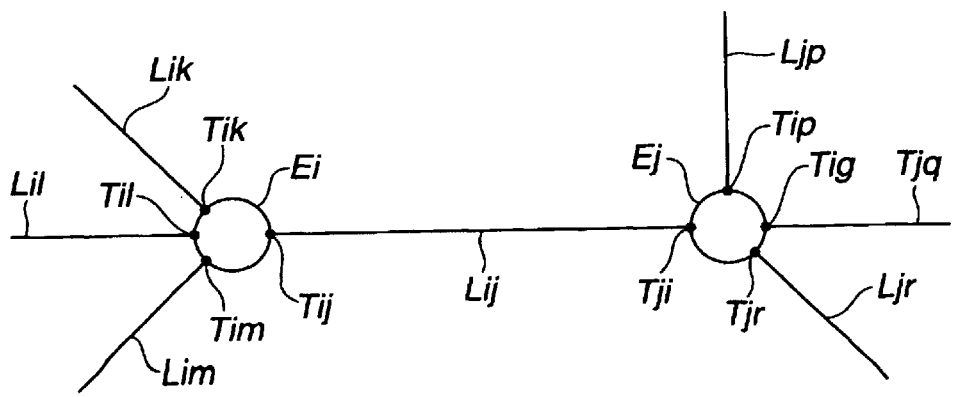
FIG. 9 illustrates the processing for active diffusion.

The element-to-element interconnection is as shown in FIG. 9, in which elements $E_i$ and $E_j$ are shown as a portion of the element-link structure constituting a document. The elements $E_i$ and $E_j$ have active values $e_i$ and $e_j$, respectively, and are interconnected by a link $L_{ij}$. A terminal point of connection of the link $L_{ij}$ to the element $E_i$ is $T_{ij}$, whilst a terminal point of connection of the link $L_{ij}$ to the element $E_j$ is $T_{ji}$. The element $E_i$, connected to the element $E_i$ through the link $L_{ij}$, is also linked to elements $E_k$, $E_l$ and to $E_m$, by links $L_{ik}$, $L_{il}$, and $L_{im}$, respectively. The element $E_j$, connected to the element $E_i$ through the link $L_{ji}$, is also linked to elements $E_p$, $E_q$ and to $E_r$, by links $L_{jp}$, $L_{jq}$ and $L_{jr}$, respectively.

At step S42, the controller 11 of the document processing apparatus initializes a counter adapted for counting the elements $E_i$ constituting the document. That is, the controller 11 sets the count value i of the counter counting the elements to 1. specifically, this counter refers to the first element $E_i$.

At step S43, the controller 11 of the document processing apparatus executes the link processing of computing active values of the element to which the counter has reference. This link processing will be explained subsequently in detail.

At step S44, the controller 11 of the document processing apparatus verifies whether or not the computation of the active values has come to a close for the totality of the elements in the document. If the computation of the active values has come to a close for the totality of the elements in the document, the controller 11 proceeds to step S45 as "YES" and, if otherwise, the controller 11 proceeds to step S47 as "NO".

Specifically, the controller 11 verifies whether or not the count value i of the counter referencing to the elements, counted by the counter, and the active values of which have been computed, has become equal to the total number of th elements contained in the document. If the count value i is equal to the total number of the elements contained in the document, the controller 11 proceeds to step S45 on the assumption that all elements have been computed and, if otherwise, the controller 11 proceeds to step S45 on the assumption that calculation for the totality of the elements has not come to a close.

At step S47, the controller 11 of the document processing apparatus increments the count value i of the counter to set the counter value to i+1. So, the counter refers to the (i+1)st element, that is to the next element. The processing reverts to the step S43 so that the sequence of steps including the calculation of terminal point active values and the following steps is executed on the next element, that is on the (i+1)st element.

Specifically, the controller 11 increments the count value i of the counter counting the elements by 1. This permits the counter to refer to the element next to the element the active value for which has been computed at step S43.

At step S45, the controller 11 of the document processing apparatus computes an average value, for each element in the document, of variations of the active elements of the totality of the elements in the document, that is the variations of a newly computed active value relative to the original active value.

The controller 11 of the document processing apparatus reads out the original values recorded in the RAM 14 and the newly computed active values, for the totality of the elements in the document. The controller 11 divides the sum total of the variations of the newly computed active values with respect to the original active values by the total number of the elements contained in the document to compute the average value of the variations of the active values of the entire elements. The controller 11 records the average value of the variations of the active values of the entire elements, thus computed, in the RAM 14.

At step S46, the controller 11 verifies whether or not the average value of the variations of the active values of the entire elements, computed at step S49, is within a pre-set threshold value, If the average value of the variations is within the threshold value, the controller 11 terminates the sequence of operations as "YES". If otherwise, the controller 11 at step S42 sets the counter value i to 1 as "NO" to re-execute the sequence of operations of computing the active values of the elements of the document. Each time the loop from step S42 to step S44, constituting the above-mentioned sequence of operations, is repeated, the variations are decreased gradually.

Figure 10:
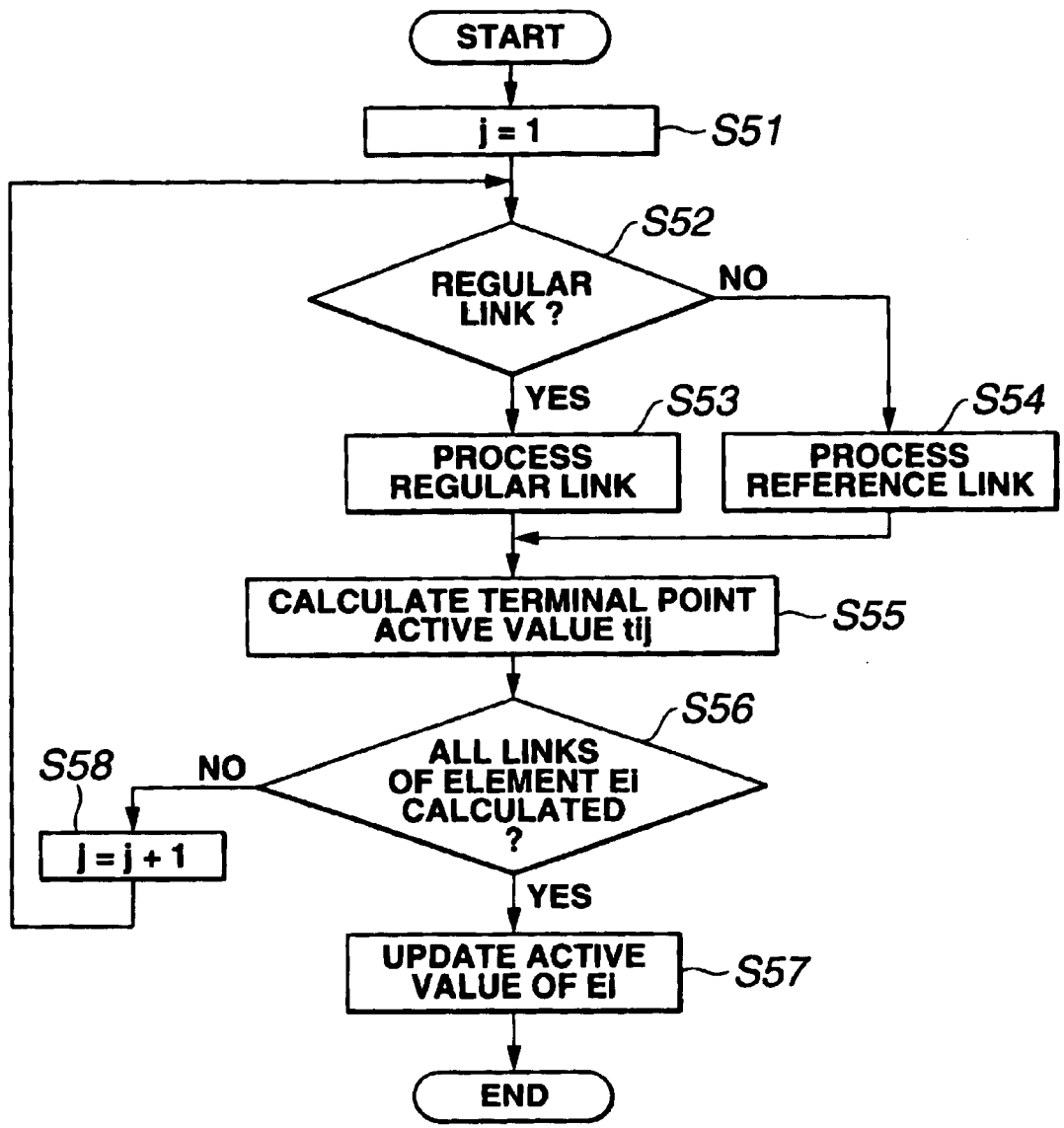
FIG. 10 is a flowchart for link processing of active diffusion.

The link processing for calculating the active value, executed at step S43, is explained by referring to the flowchart of FIG. 10.

The controller 11 of the document processing apparatus at step S51 initializes the counter counting tie number of the elements $E_i$ of the document, as shown in FIG. 9. That is, the controller 11 sets the count value j of the element counting counter to 1. That is, this counter refers to the first element $E_j$.

At step S52, the link $L_{ij}$ interconnecting the elements $E_i$ and $E_j$ verifies whether or not the link $L_{ij}$ is the ordinary link, by the controller 11 having reference to the tag. The controller 11 verifies whether the link $L_{ij}$ is the ordinary link representing the relation between the vocabulary element corresponding to the word, a sentence element corresponding to a sentence or a paragraph element corresponding to a paragraph, or a reference link representing the relation of pertinence by reciprocal referencing. This verification may be made by referring to the "relation" of FIG. 3. The controller 11 proceeds to steps S53 or S54, as "YES" or "NO", if the link is the ordinary link or the reference link, respectively.

At step S53, the processing of computing the active values of terminal points of the ordinary link $L_{ij}$ is carried out. This computation of the active values of terminal points is explained with reference to FIG. 9.

It is now apparent, by the decision at step S52, that the link $L_{ij}$ is the ordinary link. The terminal point active value $t_{ij}$ of a terminal point $T_{ij}$ of the ordinary link $L_{ij}$ connecting to the element $E_i$ is found by summing the terminal point active values $t_{ik}$, $t_{il}$ and $t_{im}$ of the entire links $L_{ik}$, $L_{il}$ and $L_{im}$ connecting to the element $E_i$ excluding the link $L_{ij}$, to the active value $e_j$ of the element $E_j$ connected to the element $E_i$ by the link $L_{ij}$ and by dividing the resulting sum by the total number of the elements contained in the document.

If the link $L_{ij}$, having a terminal $T_{ij}$ of the element $E_{ij}$ as a terminal end, is the ordinary link, the terminal point active value of the terminal point $T_{ij}$ is obtained by summing the terminal point active values of the terminal points of the element $E_j$ connected to the other end of the link $L_{ij}$ less the terminal point $T_{ji}$ connected to the link $_{Lij}$ to the active value $e_j$ of the element $E_i$ connected to the link $L_{ij}$ and by dividing the resulting sum by the total number of the elements contained in the document. This sequence of operations assures convergence of the active values in the active diffusion.

The controller 11 of the document processing apparatus reads out the terminal point active values and active values, as necessary, from the data recorded in the RAM 14. The controller 11 computes the active values of the terminal points connected to the ordinary link, as described above, in connection with the terminal point active values and the active values, as read out, and records the so-computed terminal point active values in e.g., the RAM 14.

The processing of computing the active values of the terminal point of the reference link is carried out at step S54.

It is now apparent, by the decision at step S52, that the link $L_{ij}$ is the reference link. The terminal point active value $t_{ij}$ of a terminal point $T_{ij}$ of the ordinary link $L_{ij}$ connecting to the element $E_i$ is found by summing the terminal point active values $t_{ik}$, $t_{il}$ and $t_{im}$ of the entire links $L_{ik}$, $L_{il}$ and $L_{im}$ connecting to the element $E_i$ excluding the link $L_{ij}$, to the active value $e_j$ of the element $E_j$ connected to the element $E_i$ by the link $L_{ij}$.

If the link $L_{ij}$, having a terminal $T_{ij}$ of the element $E_{ij}$ as a terminal end, is the reference link, the terminal point active value of the terminal point $T_{ij}$ is obtained by summing the terminal point active values of the terminal points of the element $E_j$ connected to the other end of the link $L_{ij}$ less the terminal point $T_{ij}$ connected to the link $L_{ij}$ to the active value $e_j$ of the element $E_j$ connected to the link $L_{ij}$.

The controller 11 of the document processing apparatus reads out the terminal point active values and active values, as necessary, from the data recorded in the RAM 14. The controller 11 computes the active values of the terminal points connected to the reference link, as described above, in connection with the terminal point active values and the active values, as read out, and records the so-computed terminal point active values in e.g., the RAM 14.

The processing on the ordinary link at step S53 and the processing on the reference link at step S54 are executed on the totality of the elements $E_j$ connecting to the element $E_i$ referenced by the counter value i at step S42.

At step S55, the controller 11 of the document processing apparatus computes the terminal point active values of the elements $E_i$, based on the computations at step S53 or S54. The controller 11 records the terminal point active values obtained on this calculation, in the RAM 14.

At step S56, it is verified whether or not the terminal point active values $t_{ij}$ have been computed on the totality of the links. If the terminal point active values have been computed on the totality of the links, the controller 11 proceeds to step S57 as "YES" and, if otherwise, the controller 11 proceeds to step S58 as "NO".

At step S57, since it has been verified at step S56 that the terminal point active values tij have been computed on the totality of the links $L_{ij}$ of the element $E_i$, the active value $e_i$ of the element $E_i$ is innovated.

The new value, that is the innovated value, of the active value $e_i$ of the element $E_i$, is found by taking the sum of the active values of the entire terminal points of the element $E_i e_i' = e_i + \Sigma t_j'$, where "'" denotes being a new value. The active value is the sum total of the terminal point active values of the terminal points of the entire links connecting to the element.

The controller 11 of the document processing apparatus reads out the terminal point active values $t_{ij}$ as necessary from the data recorded on the RAM 14. The controller 11 executes the calculations as discussed above to calculate the active value $e_i$ of the element $E_i$. The controller 11 records the new computed active value $e_i$ in e.g., the RAM 14.

Figures 11, 12:
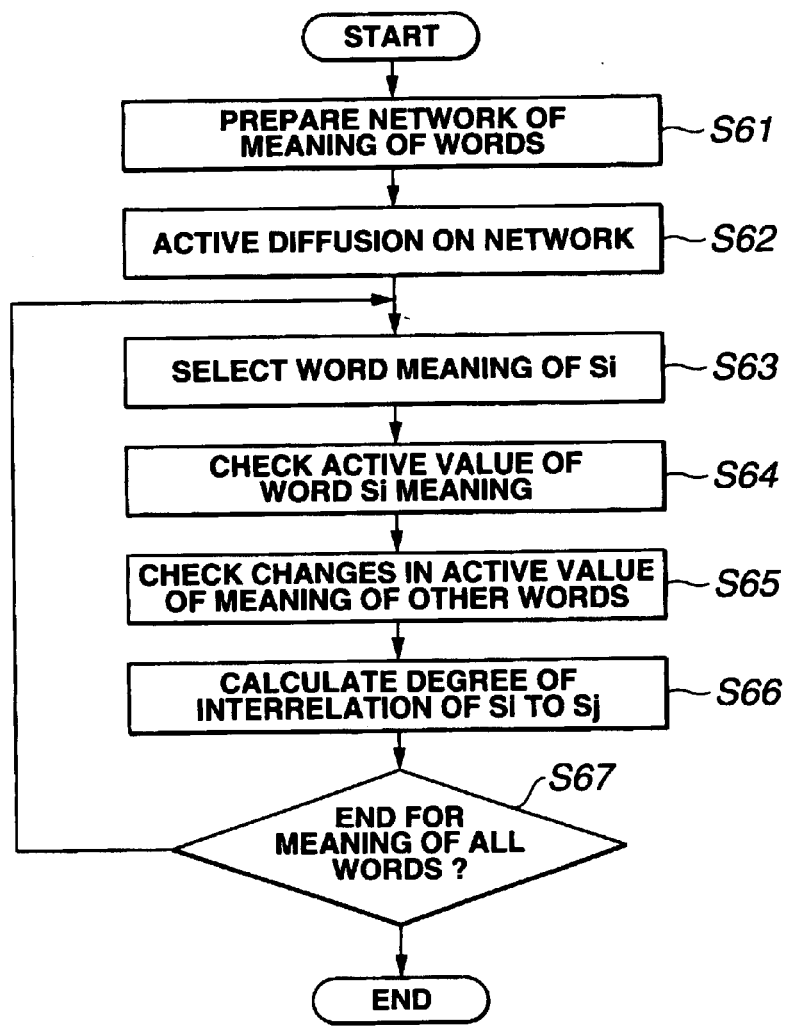
FIG. 11 is a flowchart for calculating the degree of interrelation of meanings.
FIG. 12 shows a table illustrating the degree of interrelation of meanings.

Referring to the flowchart of FIG. 11, the computation of the degree of interrelation of the semantics, executed on the basis of the aforementioned active values, is now explained. Since the computation of the degree of interrelation of the semantics is pre-processing, executed before processing shown in FIGS. 4 and 6, it suffices if the computation is executed only once.

At the initial step S61, the controller 11 prepares the network of semantics, by a dictionary, using the explanation on the semantics in an electronic dictionary. That is, the controller 11 prepares the network of the tagged structure, as described above, from the explanation of each semantics in the dictionary and the reference interrelation to semantics appearing in the explanation. This is tantamount to constructing the tagged internal structure, shown in FIG. 2, with the uppermost element being the dictionary. The controller 11 sequentially reads out the semantics and the corresponding explanation, recorded on the RAM 14, to prepare the network. The controller 14 records the so-prepared network of the semantics in e.g., the RAM 14 or the recording and/or reproducing unit 31.

This dictionary can be received by the receiver 21 over e.g., the communication network or furnished by a recording medium 32, such as a CD-ROM, for replay on the recording and/or reproducing unit 31.

At step S62, the controller 11 executes the aforementioned active diffusion on the network of semantics prepared at step S61. By this active diffusion, the active values of the respective semantics are innovated depending on the tagged internal structure imparted by the above dictionary.

The controller 11 at step S63 selects a semantics $s_i$ as a part of the network of semantics, prepared at step S61. The controller 11 then suitably changes at step S64 the initial value of the active value $e_i$ of the vocabulary element Ei corresponding to this semantics $s_i$ to compute the difference $\Delta e_i$ at this time.

At step S65, the controller 11 finds the difference $\Delta e_j$ of the active value $e_j$ of the element $e_j$ for the semantics $s_j$, associated with the change in the initial value of the active value $e_i$ of the element Ei at step S64. At step S66, the difference $\Delta e_j$ found at step S65 is divided by the difference $\Delta e_i$ found at step S65 to find a quotient $\Delta e_j/\Delta e_i$ as the degree of interrelation of the semantics $s_i$ to the semantics $s_j$. It is noted that, responsive to change of the active value of a certain semantics at step S64, the active value of the relevant word is also changed.

It is verified at step S67 whether or not the degree of interrelation has been calculated for the entire sets of the semantics $s_i$ and $s_j$. If computation of the degree of interrelation for the totality of the sets of semantics has come to a close, the sequence of the processing operations is terminated as "YES". If computation of the degree of interrelation for the totality of the sets of semantics has not come to a close, the sequence of the processing operations is terminated as "NO", such that the processing reverts to step S63 to continue the computation of the degree of interrelation for the sets for which the computation of the degree of interrelation has not come to a close.

The degree of interrelation, thus computed, is defined between respective semantics, as shown in FIG. 12. In this table of semantics, the degree of interrelation is normalized and hence assumes a value from 0 to 1. Specifically, in this table of semantics, the degree of interrelation between the "computer", "television" and "VTR" is 0.55, that between the "computer" and "television" is 0.25 and that between the "television" and "VTR" is 0.60. The controller 11 memorizes the degree of interrelation, thus prepared, in e.g., the RAM 14.

In the loop from step S63 to step S67, the controller sequentially reads out the necessary values from e.g., the RAM 14 or the recording and/or reproducing unit 31 to compute the degree of interrelation as described above. The controller 11 sends the computed degree of interrelation to the RAM 14 or to the recording and/or reproducing unit 31.

The document classification employing the discharging period calculated as described above, is hereinafter explained. The document classification exploiting the degree of interrelation is used in the document classification in GUI explained previously with reference to FIG. 5.

The document classification by degree of interrelation is performed on the basis of the degree of interrelation by having reference to the classification model representing the characteristics of the respective classification items. The classification model is constituted by including semantics other than proper nouns and addresses characteristics of the respective classification items. The classification model, shown in FIG. 13, has columns of proper noun, semantics other than the proper nouns and addresses for respective categories as respective classification items. In this classification model, the classification items are comprised of items such as "sports", "society", "computer", "plants", "art" and "art". As proper nouns associated with these classification items, "Mr.A", "Company B", "Company C", "Company G", "species D", "Mr.E" and "Mr.F" are entered. As semantics other than the proper nouns, corresponding to the classification items, "baseball" and "ground", "labor" and "employment", "mobile", "cherry 1", and "orange 1", "cherry 2" and "orange 1" and "cherry 3" are entered. As addresses associated with the respective classification items, "12345", "22222", "33333", "44444", "55555" and "66666" are entered. Meanwhile, "cherry 1", "cherry 2" and "cherry 3" indicate the first semantics (11111), second semantics (11112) and the third semantics (11113), respectively, whilst "orange 1" and "orange 2" denote the first and second semantics of the "orange", respectively.

The classification model of each classification item is extracted on the basis of the active value by the tagged internal structure. As described above, the controller 11 of the document processing apparatus at step S32 extracts an element having its active value exceeding a pre-set threshold value. The controller 11 at step S33 takes out the entire proper nouns from the element to add them to the indices, while taking out the semantics other than the proper nouns to add them to the indices. The columns of the characteristics of the classification model represent a summary of the indices generated by the above-described procedure from one classification item to another.

Figures 13, 14:
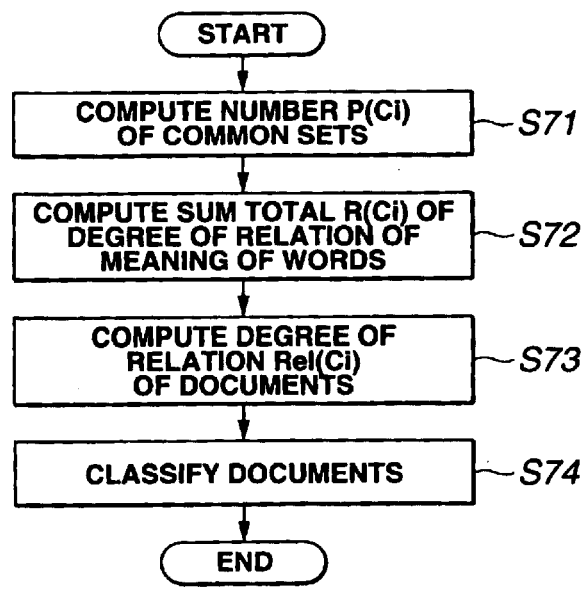
FIG. 13 shows a table illustrating a table of a model for classification.
FIG. 14 is a flowchart for document classification by the degree of pertinence.

The automatic classification of documents, carried out at step S23 of FIG. 6, is carried out by having reference to the classification model, in accordance with the sequence of processing steps, shown in the flowchart of FIG. 14, based on the degree of interrelation of semantics.

At step S71, the controller 11 assumes the number of common sets of the set of proper nouns contained in the classification item $C_i$ of the classification model and the set of the proper nouns among the words extracted at step S62 from the document and entered in the index to be $P(C_i)$. The controller 11 records the number P, so computed, in e.g., the RAM 14.

At step S72, the controller 11 refers to the table of semantics of FIG. 12 to compute the sun total of the degree of interrelation of semantics $R(C_i)$. The controller 11 takes the sum total $R(C_i)$ of the degree of interrelation of semantics, calculated at step S61, for the words in the classification model other than the proper nouns. The controller 11 records the sum total $R(C_i)$ of the degree of interrelation, as calculated, in the RAM 14.

The degree of interrelation of the document as to the item Ci is defined at step S73 to $Rel(C_i) = mP(C_i) + nR(C_i)$ where coefficients m and n are constants representing the degree of contribution to the degree of interrelation of the respective values. The controller 11 reads out the number of the common sets $P(C_i)$, as calculated at step S33, and the sum total of the degree of interrelation of the semantics $R(C_i)$ calculated at step S64 from e.g., the RAM 14 and applies the read-out values into the above equation to compute the degree of interrelation of the document $Rel(C_i)$.

Meanwhile, these coefficients m, n may be set so that m=10 and n=1. The controller 11 records the degree of interrelation of the document Rel($C_i$), thus found, in e.g., the RAM 14.

The values of the coefficients m and n may also be estimated using statistic techniques. That is, given the degree of interrelation of the document Rel($C_i$) for plural sets of the coefficients m and n, the above coefficients can be found by optimization.

If the degree of interrelation for the item $C_i$ Rel($C_i$) is the largest among the entire items, and the degree of interrelation value exceeds a certain threshold value, the controller 11 at step S74 classifies the documents in the classification item $C_i$. The controller prepares the degree of interrelation of the document Rel($C_i$) for plural items and, if the maximum degree of interrelation Rel($C_i$) exceeds a threshold value, the controller classifies the documents in the item $C_i$. If the maximum degree of interrelation Rel($C_i$) is not in excess of the threshold value, the document classification is not executed.

In the sequence of operations of computing the degree of interrelation among semantics contained in a document documents and the classification of documents derived from the computation, a document having the tagged internal structure made up of plural elements is processed and these documents are classified into a sole classification item among plural classification items. In this sequence of operations, the degree of interrelation between the document on one hand and the respective classification items on the other hand is computed and the classification item into which the document is to be classified is determined on the basis of the so-computed degree of interrelation.

It is noted that the classification items, into which the document is to be classified, are characterized by the classification model containing the proper noun and/or semantics extracted from the document. Using the classification model, the common number of the pronouns contained in the classification model of the respective classification items and the proper nouns extracted from the document is calculated, and the sum total of the degree of interrelation of the document relative to the semantics contained in the classification model of the respective classification items is found. The classification item in which the document is to be classified is determined on the basis of the number of overlapping ones of the pronouns in the document and the pronouns extracted based on the degree of interrelation, and also on the basis of the sum total of the degree of interrelation of the semantics. This degree of interrelation of the semantics is determined on the basis of the above-described tagged internal structure.

The document classification is performed on such items for which linear linking of the number of overlapping pronouns and the degree of interrelation of the semantics becomes maximum to exceed the pre-set threshold value. The coefficients of the linear linkage between the number of overlapping proper nouns and the degree of interrelation of the semantics may be statistically determined from the magnitude of the interrelation between the document and the classification items, as discussed previously.

The recording medium 32 for recording and/or reproducing the information in the recording and/or reproducing unit 31 of the document processing apparatus is hereinafter explained. On this recording medium, there is recorded a document processing program for processing a document of a tagged internal structure having plural elements. The recording medium 32 is e.g., a floppy disc capable of information recording and/or reproduction.

In the recording medium 32, the document processing program includes the processing of organizing the reference interrelation of semantics, using a dictionary which, for each semantics as the minimal unit of an element, refers to other semantics, and an active value imparting processing of imparting active values to respective semantics based on the structure of the organization of the reference interrelation constituted by reference interrelation organizing processing. The document processing program also includes the new active value imparting processing of newly imparting active values to semantics by processing the active values imparted to the semantics with active value imparting processing with calculations derived from the structure of the organization of the reference interrelation, and a degree of interrelation calculation processing of calculating a differential quotient in terms of the degree of interrelation of a given semantics with other semantics. The differential quotient is obtained on dividing a differential of an active value, imparted to the semantics in the active calculation processing, as a dependent variable, by a differential of an active value, imparted to the other semantics in the active calculation processing, as an independent variable.

To the respective semantics of the dictionary, used in the reference interrelation organizing processing, the attribute information representing the attributes of semantics is imparted. The reference interrelation organization is formulated based on the attribute information.

The document processing program includes a degree of interrelation calculating processing for calculating the reciprocal interrelation among semantics as the minimal units of the element, and a document classification processing of classifying the document based on the degree of interrelation with the semantics contained in each classification model, for plural classification items into which the document is to be classified, using a classification model containing semantics representing the characteristics of the classification items.

The degree of interrelation calculating processing of the document processing program, recorded on the recording medium 32, includes a reference interrelation organizing processing of organizing the reference interrelation of semantics, using a dictionary which, for each semantics as the minimal unit of an element, references to other semantics, and active value imparting processing of imparting a new active value to the semantics by executing the processing based on the structure of the semantics based on the structure of the reference interrelation organization constituted by the reference interrelation organizing processing, and a degree of interrelation calculation processing of calculating a differential quotient in terms of the degree of interrelation of a given semantics with other semantics. The differential quotient is obtained on dividing a differential of an active value, imparted to the semantics in the active calculation processing, as a dependent variable, by a differential of an active value, imparted to the other semantics in the active calculation processing, as an independent variable.

In the present embodiment, an example of a method for tagging a document is given, however, the present invention is, of course, not limited to this illustrative embodiment. Also, in the present embodiment, a document is transmitted from outside to the receiving unit 21 of the document processing apparatus, however, the present invention is again not limited to this illustrative embodiment. For example, the document may be written in the ROM 13 of the document processing apparatus so as to be read from the recording medium 32 in the recording and/or reproducing unit 31.

In the above-described embodiment, the device for selecting the desired element from the display unit 30 of the document processing apparatus is a mouse. The present invention is, however, not limited to this embodiment. For inputting the element in the document processing apparatus, input devices, such as a tablet or a write pen, may be used.

INDUSTRIAL UTILIZABILITY

With the present invention as described above, the degree of interrelation of semantics can be calculated and used to execute document processing such as automatic classification of documents reflecting the interest of the user based on the degree of interrelation. The document processing based on the degree of interrelation of semantics can be executed automatically to relieve the load of the user in document processing.

What is claimed is:

1. A method for processing a document having an internal structure made up of a plurality of elements, the method comprising:
   a characteristic information extracting step of extracting characteristics of the document;
   a document classification step of classifying the document into a plurality of classification items making up a classification model depending on a degree of interrelation between the characteristic information of the document extracted by the characteristic information extracting step and characteristic information of the plurality of classification items; and
   a calculation step of calculating the degree of interrelation between the characteristic information of the document extracted in the characteristic information extracting step and the characteristic information of the classification items and classifying the document in one of the classification items with a maximum degree of interrelation when the degree of interrelation exceeds a threshold value.

2. The document processing method according to claim 1, further comprising a step of receiving a plurality of documents, the characteristic information extracting step extracting the characteristic information representing characteristics of each of the plurality of documents received in the step of receiving.

3. The document processing method according to claim 1, wherein a weight is imparted to each of the plurality of elements based on the internal structure of the document, the characteristic information extracting step extracting any element of the plurality of elements having a respective weight larger than a pre-set value.

4. The document processing method according to claim 1 wherein the document classification step classifies the document using a classification model which is prepared based on the classification step of classifying the document into the plurality of classification items.

5. The document processing method according to claim 1, wherein the degree of interrelation of the characteristic information of the document extracted in the characteristic information extracting step and the characteristic information of said the plurality of classification items is a linear linkage of a number of overlapping ones of proper nouns contained in the document characteristic information and of proper nouns contained in the characteristic information of said the plurality of classification items, and a degree of interrelation between semantics other than the proper nouns contained in the document characteristic information and semantics other than the proper nouns contained in said the plurality of classification items.

6. The document processing method according to claim 5, wherein, to obtain the degree of interrelation of the semantics, each of the semantics is weighted based on a structure of reciprocal referencing among the semantics, and a difference of a weight, imparted to one of the semantics as a dependent variable, is divided by a difference of a weight, imparted to the other semantics as an independent variable, with a resulting quotient being the degree of interrelation between the one and the other semantics.

7. The document processing method according to claim 6, wherein the interrelation of reciprocal referencing among the semantics is prepared using a dictionary which, for each of the semantics, references other semantics.

8. A method for processing a document having an internal structure made up of a plurality of semantics, the method comprising:
   a weighting step for weighting each of the semantics based on a structure of reciprocal referencing among the semantics, wherein the weighting step imparts a weight based on the structure of reciprocal referencing obtained on organizing the reciprocal referencing of semantics using a dictionary which, for each of the semantics, references other semantics; and
   a degree of interrelation calculating step of dividing a difference of a weight, imparted to one of the semantics as a dependent variable, by a difference of a weight, imparted to the other semantics as an independent variable, with a resulting quotient being the degree of interrelation between the one and the other semantics.

9. The document processing method according to claim 8, wherein attribute information representing attributes of each of the semantics of said the dictionary is imparted to each of the semantics in the dictionary, and wherein the structure of the reciprocal referencing is based on the attribute information.

10. A method for processing a document having an internal structure made up of a plurality of elements, the method comprising:
    a characteristic information extracting step of extracting characteristics of the document; and
    a document classification step of classifying the document into a plurality of classification items making up a classification model depending on a degree of interrelation between the characteristic information of the document extracted by the characteristic information extracting step and the characteristic information of the plurality of classification items,
    wherein the degree of interrelation of the characteristic information of the document extracted in the characteristic information extracting step and the characteristic information of the plurality of classification items is a linear linkage of a number of overlapping ones of proper nouns contained in the document characteristic information and of proper nouns contained in the characteristic information of the classification items, and a degree of interrelation between semantics other than the proper nouns contained in the document characteristic information and semantics other than the proper nouns contained in the plurality of classification items.

11. The document processing method according to claim 10, further comprising a step of receiving a plurality of documents, the characteristic information extracting step extracting the characteristic information representing characteristics of each of the plurality of documents received in the step of receiving.

12. The document processing method according to claim 10, wherein a weight is imparted to each of the plurality of elements based on the internal structure of the document, the characteristic information extracting step extracting any element of the plurality of elements having a respective weight larger than a pre-set value.

13. The document processing method according to claim 10 wherein the document classification step classifies the document using a classification model which is prepared based on the classification step of classifying the document into the plurality of classification items.

14. The document processing method according to claim 10 wherein to obtain the degree of interrelation of the semantics, each of the semantics is weighted based on a structure of reciprocal referencing among the semantics, and a difference of a weight, imparted to one of the semantics as a dependent variable, is divided by a difference of a weight, imparted to the other semantics as an independent variable, with a resulting quotient being the degree of interrelation between the one and the other semantics.

15. The document processing method according to claim 14, wherein the interrelation of reciprocal referencing among the semantics is prepared using a dictionary which, for each of the semantics, references other semantics.

* * * * *